United States Patent [19]

Stewart

[11] 4,011,362

[45] Mar. 8, 1977

[54] METAL SUBSTRATES WITH CARBOXYFUNCTIONAL SILOXANE RELEASE COATINGS

[75] Inventor: Howard Franklin Stewart, Midland, Mich.

[73] Assignee: Dow Corning Corporation, Midland, Mich.

[22] Filed: Jan. 12, 1976

[21] Appl. No.: 648,066

Related U.S. Application Data

[62] Division of Ser. No. 457,007, April 1, 1974, abandoned.

[52] U.S. Cl. .................................. 428/447; 29/132; 260/46.5 R; 260/46.5 Y; 427/387; 427/388 D; 428/450; 428/457; 106/287 SB

[51] Int. Cl.² .................... B32B 15/08; C07F 7/08; C08G 77/14; C08G 77/22

[58] Field of Search .................. 428/447, 450, 457; 260/46.5 R, 46.5 Y, 448, 2 B, 825; 106/287 SB; 427/388 D, 387; 29/132

[56] References Cited

UNITED STATES PATENTS

| | | | |
|---|---|---|---|
| 2,721,856 | 10/1955 | Sommer | 260/46.5 Y |
| 2,723,987 | 11/1955 | Speier | 260/46.5 Y |
| 2,900,363 | 8/1959 | Bluestein | 260/46.5 Y |
| 2,925,402 | 2/1960 | Speier | 260/46.5 Y |
| 2,957,899 | 10/1960 | Black | 260/46.5 Y |
| 3,015,646 | 1/1962 | Speier | 260/46.5 Y |
| 3,047,528 | 7/1962 | Bluestein | 260/46.5 Y |
| 3,143,524 | 8/1964 | Cooper | 260/46.5 R |
| 3,328,482 | 6/1967 | Northrup | 428/447 |
| 3,729,444 | 4/1973 | Bey | 260/46.5 Y |
| 3,812,201 | 5/1974 | Bey | 260/46.5 R |

FOREIGN PATENTS OR APPLICATIONS

| | | | |
|---|---|---|---|
| 601,840 | 7/1960 | Canada | 260/46.5 Y |
| 579,874 | 7/1959 | Canada | 260/46.5 Y |
| 578,096 | 6/1959 | Canada | 260/46.5 Y |
| 875,759 | 8/1961 | United Kingdom | 260/46.5 Y |

*Primary Examiner*—Ellis P. Robinson
*Attorney, Agent, or Firm*—Jack E. Moermond

[57] ABSTRACT

Metal substrates such as molds and fuser rolls are coated with carboxyfunctional siloxanes to improve their release characteristics.

3 Claims, No Drawings

METAL SUBSTRATES WITH CARBOXYFUNCTIONAL SILOXANE RELEASE COATINGS

This application is a division of application Ser. No. 457,007 filed Apr. 1, 1974 now abandoned.

This invention relates to metal substrates having on the surface thereof, in an amount sufficient to improve the release characteristics of said substrate, a siloxane composed essentially of from 0.1 to 50 mole percent of $R_aR'_bSiO_{(4-a-b/2)}$ units and from 50 to 99.9 mole percent of $R''_cSiO_{(4-c/2)}$ units wherein R is a carboxy functional radical, $a$ has an average value from 1 to 3, R' is a hydrocarbon or halogenated hydrocarbon radical, $b$ has an average value from 0 to 2, the sum of $a + b$ is from 1 to 3, R'' is a hydrocarbon or a halogenated hydrocarbon radical, and $c$ has an average value from 0 to 3.

In the above formula R can be any carboxyfunctional radical. In its broadest meaning herein a carboxy-functional radical is one which contains a COOH group and is attached to the silicon atom via a silicon-carbon (Si—C) bond. So far as is known at this time, these two characteristics are the only essential ones for the instant invention. A preferred embodiment of R is when it is a carboxyfunctional radical of the structure HOOC—Q— wherein Q is a divalent linking group attached to the silicon atom via a silicon-to-carbon bond. Preferred embodiments of Q are alkylene radicals containing from 2 to 10 carbon atoms, and radicals containing from 2 to 10 carbon atoms which are composed of carbon, hydrogen and sulfur atoms, the sulfur atoms being present in the form of thioether linkages. Illustrative examples of Q are incorporated in the disclosure and examples which follow. Specific examples of suitable R radicals include, for example, $-CH_2CH_2COOH$, $-CH_2CH(CH_3)COOH$, $-(CH_2)_6COOH$, $-(CH_2)_{11}COOH$, $-(CH_2)_{18}COOH$, $-CH_2CH_2SCH_2COOH$, $-C_6H_4-CH_2-C_6H_4-COOH$, $-CH_2-C_6H_4-C_6H_4-CH_2COOH$, $-CH_2CH_2OCH_2COOH$, $$-C_6H_4-S-C_6H_4-COOH,\ -CH_2CH(CH_3)\overset{O}{\overset{\|}{C}}O-CH_2CH_2COOH,$$

and $$-(CH_2)_2\overset{O}{\overset{\|}{C}}S-CH_2CH_2COOH.$$

It is preferable that the R radical contain no more than 18 carbon atoms. There can be 1, 2 or 3 R radicals attached to the silicon atoms, i.e., $a$ has an average value of from 1 to 3. Generally speaking there will be only one R radical (a=1) attached to most silicon atoms since these are the most practical siloxanes to prepare at this time.

The R' radical can be any hydrocarbon or halogenated hydrocarbon radical which is compatible with the carboxyfunctional radical. By way of illustration, R' can be an alkyl radical such as the methyl, ethyl, propyl, butyl, octyl, dodecyl, octadecyl and myricyl radicals; an alkenyl radical such as the vinyl, allyl and hexenyl radicals; cycloalkyl radicals such as the cyclobutyl and cyclohexyl radicals; aryl radicals such as the phenyl, xenyl and naphthyl radicals; aralkyl radicals such as the benzyl and 2-phenylethyl radicals; alkaryl radicals such as the tolyl, xylyl and mesityl radicals; and the corresponding halohydrocarbon radicals such as the 3-chloropropyl, 4-bromobutyl, 3,3,3-trifluoropropyl, chlorocyclohexyl, bromophenyl, chlorophenyl, alpha, alpha, alpha-trifluorotolyl and the dichloroxenyl radicals. It is preferred that R' contain from 1 to 18 carbon atoms with the methyl radical being most preferred. There can be 0, 1 or 2 R' radicals attached to each silicon atom, i.e., the average value of $b$ is from 0 to 2, so long as the sum of $a + b$ (the total of R and R' radicals attached to each silicon atom) does not exceed 3 (i.e., the sum of $a + b$ is from 1 to 3). Preferably $b$ has a value of 0 or 1.

The R'' radical in the above formula can be any hydrocarbon or halogenated hydrocarbon radical. For specific examples of R'' radicals reference is made to examples for R' set forth above which are equally applicable here and not listed again for the sake of brevity. The subscript $c$ can have an average value of from 0 to 3, i.e., $c$ can be 0, 1, 2 or 3. Preferably $c$ has an average value of 2.

The siloxanes of this invention can be composed of from 0.1 to 50 mole percent of the carboxyfunctional siloxane units and from 50 to 99.9 mole percent of the other siloxane units. While it is obvious from the foregoing that he siloxane can be composed of up to 50 mols percent carboxyfunctional siloxane units, it is preferred at this time that the carboxyfunctional siloxane units constitute from 0.25 to 10 mole percent of the total siloxane units present. In all release applications on metal substrates tested to date this preferred range seems to give the desired release characteristics most economically.

While the foregoing carboxyfunctional siloxanes can be applied to the metal substrate alone, and indeed this is preferred, it is possible to apply such siloxanes to the metal substrate in admixture with a polydimethylsiloxane fluid of the general formula $(CH_3)_3SiO[(CH_3)_2-SiO]_xSi(CH_3)_3$ wherein $x$ is an integer. The viscosity of this fluid is not known to be critical and can range from 0.65 to 1,000,000 centistokes at 25° C. although practical considerations dictate a viscosity in the range of 100 to 100,000 centistokes as being preferred. The relative amounts of the carboxyfunctional siloxane and the polydimethylsiloxane can range from 1 to 99 percent by weight of each, although it is preferred that the carboxyfunctional siloxane constitute at least 50 percent by weight of the admixture.

The carboxyfunctional siloxane, alone or in combination with the polydimethylsiloxane, can be applied to the metal substrate neat or in solution in a suitable solvent, for example an aliphatic or aromatic hydrocarbon or halogenated hydrocarbon solvent. The technique of application is not known to be critical at this time and can vary from pouring the siloxane over the metal substrate to painting it on with a brush. Other suitable application techniques include spraying, wiping and dipping. The amount applied need only be enough to leave a thin film or coating of the siloxane on the metal surface and any excess beyond this amount should be removed for best results. Thus it also becomes apparent that the application techniques which accomplish this result are the sensible ones to use.

Generally speaking, no further steps are required subsequent to application of the siloxane to obtain the enhanced characteristics. It has been speculated, however, that heating of the metal substrate subsequent to application of the siloxane may cause the siloxane to become more permanently attached to the metal surface, presumably through some bonding mechanism via the carboxyfunctional group. An alternative to this technique would be to apply the siloxane to a previously heated metal substrate. The foregoing is theoretical at this point and is offered for whatever benefit it may have to those skilled in the art, but the present invention is in no way limited to or by this theory.

It is believed that the siloxanes of this invention can be applied to any metal substrate whether made of pure metal or some alloy thereof. Obviously, the release characteristics will vary depending on the particular substrate, and there will be more of a demand or need for this invention on selected substrates. For example, the advantages of this invention can be obtained on aluminum, brass, copper, tin, zinc, lead, steel, iron, platinum, gold, silver, bronze, monel, iridium, ruthenium, tungsten, vanadium, chromium and nickel.

The advantages of the present invention have particular commercial interest at this time for application to copper or copper alloys. More specifically, the invention is directed to such metals in the form of fuser rolls in copying or duplicating machines such as a xerography machine. Most of the present fuser rolls consist of a metal roll with an outer Teflon jacket or sleeve and an inner heater. These fuser rolls operate at high temperatures of about 375° to 400° F. due to the thermal barrier effect of the Teflon which causes about a 75° F. temperature drop between the roll and its surface. A polydimethylsiloxane fluid ("fuser oil") is applied to the Teflon to act as a release agent during the copying process. With the carboxyfunctional siloxanes of this invention it has become possible to eliminate the Teflon sleeve on the roll, lower the operating temperature of the fuser roll, and still obtain good release of the toner powder.

Now in order that those skilled in the art may better understand how the present invention can be practiced, the following examples are given by way of illustration and not by way of limitation.

EXAMPLE 1

Steel panels (1 × 4 × 0.060 inch) were cleaned ultrasonically 2 times for 1 minute each time in toluene then once for 1 minute in acetone. These panels were then laid out on paper towels and dried in a 250° F. oven for 15 minutes. After drying the panels were labeled, and then sprayed at a distance of 12 inches for about 1 second with the solution identified below. After the solution had air dried the release characteristics of the panels were tested by placing about 15 to 30 pellets of nylon 66 (condensation product of adipic acid and hexamethylenediamine) on the end inch of the panel, placing another treated panel on top of the nylon pellets facing 180° and overlapping 1 inch. The "laminate" was placed in a steam heated press which was closed by air pressure, and after 45 seconds the hydraulic pressure was raised to 1000 psi and held there for 60 seconds. The press was then opened, the laminate carefully removed and quenched in water, then placed in a paper towel and pulled apart on an Instron tester and the force required to separate recorded. After the Instron test the nylon layer is peeled by hand from the remaining panel and rated on a scale of 0 to 4 with 0 indicating low adhesion and 4 indicating very high adhesion.

The solution applied to the panel in this example was a 1% by weight dispersion of a trimethylsiloxy endblocked carboxyfunctional siloxane composed of about 5 mole percent $(CH_3)HOOCCH_2SCH_2CH_2SiO$ units, about 1 mole percent $(CH_3)CH_2{=}CHSiO$ units, and about 94 mole percent $(CH_3)_2SiO$ units in hexane. This solution was prepared by mixing the siloxane into about 10–20 ml. of hexane with an ultrasonic mixer and then adding the remaining hexane for proper dilution.

In the Instron test a force of about 5 psi was required to separate the panels and in the peel test a rating of 0–1 was assigned.

The above procedure was repeated except that the following solutions are substituted for the one used above. Solution (A) was a 1% by weight dispersion of a trimethylsiloxy endblocked carboxyfunctional siloxane composed of about 1 mole percent $(CH_3)HOOCCH_2SCH_2CH_2SiO$ units, about 5 mole percent $(CH_3)CH_2{=}CHSiO$ units, and about 94 mole percent $(CH_3)_2SiO$ units in hexane. Solution (B) was a 1% by weight dispersion of a trimethylsiloxy endblocked carboxyfunctional siloxane composed of about 2.5 mole percent $(CH_3)HOOCCH_2SCH_2CH_2SiO$ units, about 3.5 mole percent $(CH_3)CH_2{=}CHSiO$ units, and about 94 mole percent $(CH_3)_2SiO$ units in hexane. Solution (C) was a 1% by weight dispersion of a 350 centistoke trimethylsiloxy endblocked siloxane composed of 100 mole percent $(CH_3)_2SiO$ units in hexane. Solution (C) was included for purposes of comparison. For these solutions the results of the Instron test was not recorded. In the peel test solutions (A) and (B) rated as 0–1 whereas solution (C) rated 3–4.

EXAMPLE 2

When the carboxyfunctional siloxanes set forth below are substituted for those employed in the preceding example, similar results are obtained.

---

(A) $(CH_3)_3SiO[(CH_3)_2SiO]_{95}[(CH_3)CH_2{=}CHSiO]_2-$
$[CH_3SiO]_1Si(CH_3)_3.$
|
$CH_2CH_2SCH_2COOH$ (B) $(CH_3)_3SiO[(CH_3)_2SiO]_{95}[(CH_3)CH_2{=}CHSiO]_{2.5}-$
$[CH_3SiO]_{0.5}Si(CH_3)_3.$
|
$CH_2CH_2SCH_2COOH$ (C) $(CH_3)_3SiO[(CH_3)_2SiO]_{92}[(CH_3)CH_2{=}CHSiO]_4-$
$[CH_3SiO]_2Si(CH_3)_3.$
|
$CH_2CH_2SCH_2COOH$ (D) $(CH_3)_3SiO[(CH_3)_2SiO]_{88}[CH_3SiO]_{10}Si(CH_3)_3.$
|
$CH_2CH_2SCH_2COOH$ (E) $(CH_3)_3SiO[(CH_3)_2SiO]_{96}[CH_3SiO]_2Si(CH_3)_3.$
|
$CH_2CH(CH_3)COOH$ (F) $HO(CH_3)_2SiO[(CH_3)_2SiO]_{95}[CH_3SiO]_5Si(CH_3)_2OH.$
|
$(CH_2)_3SCH_2CH_2COOH$

-continued (G) $HO(CH_3)_2SiO[(CH_3)_2SiO]_{50}[CH_3SiO]_{50}Si(CH_3)_2OH$, with $CH_2CH_2SCH_2COOH$ on the $CH_3SiO$ silicon (H) 3 mole percent $(CH_3)_3SiO_{1/2}$
87 mole percent $(CH_3)_2SiO$
10 mole percent $(CH_3)HOOCCH_2CH_2CH_2SiO$ (I) 5 mole percent $C_5H_{11}SiO_{3/2}$
92 mole percent $(CH_3)_2SiO$
3 mole percent $(CH_3)HOOCCH_2OCH_2CH_2CH_2SiO$ (J) 10 mole percent $(CH_3)C_6H_5SiO$
85 mole percent $(CH_3)_2SiO$
5 mole percent $(CH_3)HOOCCH_2CH_2CH_2CH_2CH_2CH_2SiO$ (K) 7 mole percent $(CH_3)CF_3CH_2CH_2SiO$
83 mole percent $(CH_3)_2SiO$
7 mole percent $(CH_3)HOOCCH_2CH_2SiO$
3 mole percent $HOOCC_6H_4SiO_{3/2}$ (L) 1 mole percent $ClCH_2CH_2CH_2SiO_{3/2}$
98 mole percent $(CH_3)_2SiO$
1 mole percent $(CH_3)HOOCCH_2CH_2SiO$ (M) 2 mole percent $SiO_{4/2}$
48 mole percent $(CH_3)_2SiO$
50 mole percent $(CH_3)HOOCCH_2CH_2CH_2COOCH_2CH_2CH_2SiO$ (N) 2 mole percent $Cl_2C_6H_3SiO_{3/2}$
88 mole percent $(CH_3)_2SiO$
10 mole percent $(CH_3)HOOCCH_2SCH_2CH_2SiO$ (O) 2 mole percent $(CH_2)_3SiO_{1/2}$
97.9 mole percent $(CH_3)_2SiO$
0.1 mole percent $(CH_3)HOOCCH_2SCH_2CH_2SiO$ (P) 5 mole percent $(CH_3)_2(C_6H_5)SiO_{1/2}$
10 mole percent $(CH_3)(C_6H_5)SiO$
80 mole percent $(CH_3)_2SiO$
5 mole percent $(BrCH_2CH_2CH_2)HOOCCH_2CH_2SCH_2CH_2CH_2SiO$ (Q) A composition consisting essentially of 25% by weight of $(CH_3)_3SiO[(CH_3)_2SiO]_xSi(CH_3)_3$ having a viscosity of about 350 cs. and 75% by weight of $(CH_3)_3SiO-[(CH_3)_2SiO]_{94}[(CH_3)CH_2{=}CHSiO]_1[CH_3SiO]_5Si(CH_3)_3$, with $CH_2CH_2SCH_2COOH$ on the $CH_3SiO$ silicon

EXAMPLE 3

When the carboxyfunctional siloxanes of the preceding examples are sprayed onto bare metal fuser rolls made of copper, copper alloy or steel a coating is obtained thereon which exhibits enhanced release properties.

EXAMPLE 4

When the carboxyfunctional siloxanes of Examples 1 and 2 are sprayed or wiped on metal molds, improved release of plastic parts from the thus treated metal surfaces can be obtained. More specifically, when the carboxyfunctional siloxanes of Examples 1 and 2 are applied to metal molds used in injection molding equipment, extended mold release life of 2 to 10 times can be obtained over release life obtained with similar viscosity polydimethylsiloxane fluids.

EXAMPLE 5

When the carboxyfunctional siloxanes of Examples 1 and 2 are applied to the inside surfaces of metal containers, improved release of sticky substance and improved drainage of liquids therefrom can be obtained.

That which is claimed is:

1. A metal substrate having on the surface thereof, in an amount sufficient to improve the release characteristics of said substrate, a composition consisting essentially of (1) from 1 to 99 percent by weight of a siloxane fluid having the general formula $(CH_3)_3SiO[(CH_3)_2SiO]_xSi(CH_3)_3$ wherein $x$ is an integer, and (2) from 1 to 99 percent by weight of a siloxane composed essentially of from 0.1 to 50 mole percent of $R_aR'_bSiO_{(4-a-b)/2}$ units and from 50 to 99.9 mole percent of $R''_cSiO_{(4-c)/2}$ units wherein
R is a carboxyfunctional radical,
$a$ has an average value from 1 to 3,
R' is a hydrocarbon or halogenated hydrocarbon radical,
$b$ has an average value from 0 to 2,
the sum of $a + b$ is from 1 to 3,
R'' is a hydrocarbon or halogenated hydrocarbon radical, and
$c$ has an average value from 0 to 3.

2. A metal substrate as defined in claim 1 wherein (1) has a viscosity in the range of 100 to 100,000 centistokes at 25° C. and (2) constitutes at least 50 percent by weight of the composition.

3. In a process of treating a metal substrate to improve the release characteristics thereof, said process including the step of applying a substance to the metal substrate which substance enhances the release characteristics of said substrate, the improvement comprising applying to the metal substrate as the substance which enhances the release characteristics a composition consisting essentially of (1) from 1 to 99 percent by weight of a siloxane fluid having the general formula $(CH_3)_3SiO[(CH_3)_2SiO]_xSi(CH_{33})$ wherein $x$ is an integer, and (2) from 1 to 99 percent by weight of a siloxane composed essentially of from 0.1 to 50 mole percent of $R_aR'_bSiO_{(4-a-b)/2}$ units and from 50 to 99.9 mole percent of $R''_cSiO_{(4-c)/2}$ units wherein
R is a carboxyfunctional radical,
$a$ has an average value from 1 to 3,
R' is a hydrocarbon or halogenated hydrocarbon radical,
$b$ has an average value from 0 to 2,
the sum of $a + b$ is from 1 to 3,
R'' is a hydrocarbon or halogenated hydrocarbon radical, and
$c$ has an average value from 0 to 3.

* * * * *

UNITED STATES PATENT AND TRADEMARK OFFICE

CERTIFICATE OF CORRECTION

PATENT NO. : 4,011,362

DATED : March 8, 1977

INVENTOR(S) : HOWARD FRANKLIN STEWART

It is certified that error appears in the above-identified patent and that said Letters Patent are hereby corrected as shown below:

Column 2, line 25, "he" should read --the--

Column 2, line 26, "mols" should read -- mole --.

Column 2, line 38, "$)_2$-SiO$]_x$Si$(CH_3)_3$" should read --$)_2$SiO$]_x$Si$(CH_3)_3$--

Column 2, line 65, "enhanced characteristics" should read --enhanced release characteristics--

Column 5, Section K, line 4, "3 mole percent $HOOCC_5H_4SiO_{3/2}$" should read -- 3 mole percent $HOOCC_6H_4SiO_{3/2}$--

Column 5, Section O, line 1, "2 mole percent $(CH_2)_3SiO_{1/2}$" should read --2 mole percent $(CH_3)_3SiO_{1/2}$--

Column 6, line 53, "$(CH_3)_3SiO[(CH_3)_2SiO]_xSi(CH_{33})$" should read --$(CH_3)_3SiO[(CH_3)_2SiO]_xSi(CH_3)$--

Signed and Sealed this

*Sixteenth* Day of *October 1979*

[SEAL]

*Attest:*

RUTH C. MASON
*Attesting Officer*

LUTRELLE F. PARKER
*Acting Commissioner of Patents and Trademarks*